(No Model.)

H. BADER & H. D. CARTWRIGHT.
SUPPORT FOR MIRRORS.

No. 592,042. Patented Oct. 19, 1897.

WITNESSES

INVENTORS
Henry Bader
Harry D. Cartwright
BY Edgar Tate & Co
ATTORNEYS

THE NORRIS PETERS CO., PHOTO-LITHO., WASHINGTON, D. C.

UNITED STATES PATENT OFFICE.

HENRY BADER AND HARRY DUDLEY CARTWRIGHT, OF SAN FRANCISCO, CALIFORNIA.

SUPPORT FOR MIRRORS.

SPECIFICATION forming part of Letters Patent No. 592,042, dated October 19, 1897.

Application filed October 21, 1896. Serial No. 609,561. (No model.)

*To all whom it may concern:*

Be it known that we, HENRY BADER and HARRY DUDLEY CARTWRIGHT, citizens of the United States, and residents of San Francisco, in the county of San Francisco and State of California, have invented certain new and useful Improvements in Supports for Mirrors, of which the following is a specification, reference being had to the accompanying drawings, forming a part thereof, in which similar numerals of reference indicate corresponding parts wherever found throughout the several views.

This invention relates to supports for mirrors, and the object thereof is to provide improved devices of this class which are adapted to be connected with a bureau or dressing-case or with the sides of a window, a further object being to provide an improved support for mirrors which is connected with the frame thereof, and adapted to be connected with any suitable support, and by means of which the mirror may be supported at any desired angle or turned in a vertical plane or swung on its support in a horizontal plane.

The invention is fully disclosed in the following specification, of which the accompanying drawings form a part, in which—

Figure 1:
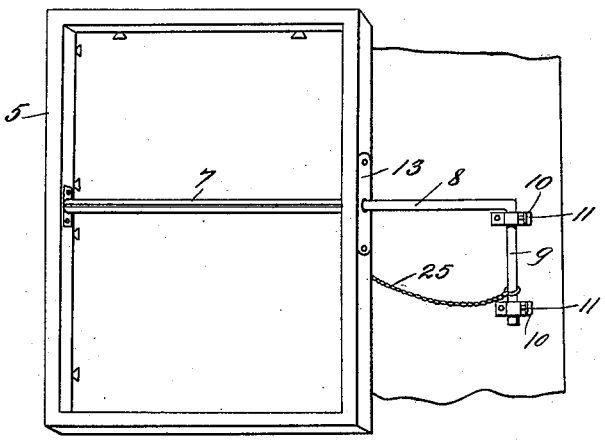
Figure 2:
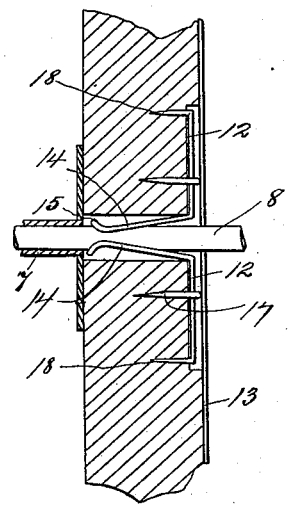
Figure 3:
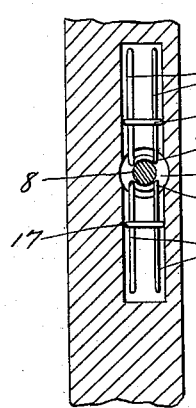
Figures 4, 5:
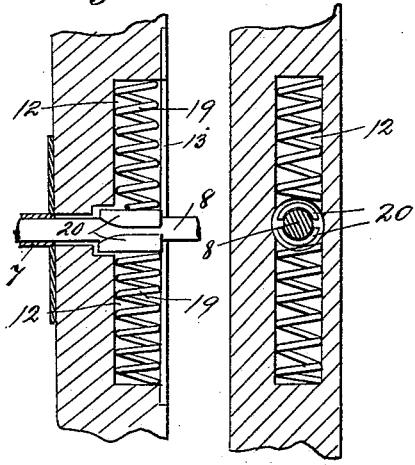

Figure 1 is a back view of a mirror provided with our improved support; Fig. 2, a section of one side of the frame; Fig. 3, a section at right angles to the section shown in Fig. 2; Fig. 4, a view similar to Fig. 2, showing a modified form of construction; Fig. 5, a section of the construction shown in Fig. 4, taken at right angles thereto; and Fig. 6, a transverse section of a part of the frame and of the mirror and showing our improved backing for the mirror.

In the practice of our invention we provide a frame 5, which, as shown in the drawings, is rectangular in form, but which may be circular or of any preferred form, and said frame is preferably composed of wood, and arranged transversely thereof, and at the back of the mirror is a split tube 7, or a tube composed of separate parts, said tube being secured between the separate sides of the frame, as shown in Fig. 1, and we also provide a rod 8, which is adapted to be passed through one or both of the sides of the frame and through the tube 7, and said rod is provided with a depending arm 9, which passes through brackets or keepers 10, which may be secured to any suitable support, and which are provided with set-screws 11.

Formed in the sides of the frame at each side of the rod 8 are vertical chambers 12, which are covered by plates 13, and we also provide spring-clamps 14, which are U-shaped in form, and which project into the central transverse bore 15, through which the rod 8 passes, and which are adapted to grasp and hold said rod, as shown in Fig. 2, and said spring-clamps are provided with arms 16, which project into said chambers at an angle to the rod 8, or to the central bore 15, through which the rod passes, and said arms are held in place by staples 17, which are driven into the sides of the frame, and the ends thereof are provided with prongs 18, which are also driven into the frame.

The spring-clamps 14 are designed to press upon the rod 8, so as to produce sufficient friction to hold the frame at any desired point on said rod and at any desired angle thereto, it being understood that the frame is free to turn on the rod 8, and that said rod or the arm 9 thereof is free to turn in the keepers 10, and it will thus be seen that the mirror may be turned in a horizontal plane by turning the rod 8, or that said mirror may be turned in a vertical plane on said rod, and the spring-clamps 14 are designed to hold the frame at any desired angle on said rod. In Figs. 4 and 5 we have shown a modification of this construction, in which the chambers 12 are enlarged, and placed therein are spiral springs 19, which bear upon segmental clamps or jaws 20, which press upon the opposite sides of the rod 8, and the spiral springs 19 are of such force as to produce the result hereinbefore described, and this form of clamp is designed particularly for use in connection with large or heavy mirrors. It will be understood that the split tube 7 serves as a guide for the rod 8, and the frame of the mirror is also free to slide longitudinally on said rod, and said tube 7 may consist of a single piece if desired, but by forming the same of separate parts we provide additional frictional engagements for the rod 8, as will be readily understood, which may be done by bending one of the edges inwardly upon the rod, and we also provide a check-chain 25, which is adapted to be connected with the shaft or arm 9 of the rod 8 and with the side of the frame, as shown in Fig. 1.

It will thus be seen that we provide a support for a mirror, by means of which the mirror is capable of three separate adjustments. Said mirror may be swung in a horizontal plane on its main support, or it may be turned in a vertical plane on said support, and may also be adjusted toward or from its main support.

This device is of great advantage when employed in connection with dressing-cases, and as will be apparent it may be connected with the frame of a window, and in practice two of them will preferably be employed, one at each side of the dresser, or one at each side of the window frame or support.

Figure 6:
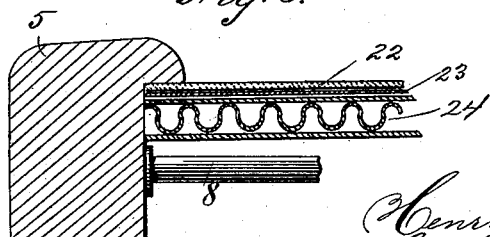

We also provide improved means for securing the mirror in the frame, and for this purpose the mirror 22 is provided with a back 23, composed of pasteboard or similar material, back of which is placed a packing 24, consisting of corrugated strawboard, as shown in Fig. 6, and it will be apparent that this feature of the construction herein shown and described is not in any way related to the support for the mirror, and may or may not be employed.

Having fully described our invention, we claim as new and desire to secure by Letters Patent—

1. The combination with a mirror, which is provided transversely of the back thereof, with a friction-tube, which is secured between the sides of the frame, and the ends of which register with openings formed in said sides, and a rod which is passed through the sides of the frame and into said tube, and which is adapted to turn therein, and one end of which projects and is provided with an arm at right angles thereto, which is adapted to be passed through keepers or brackets secured to a support, and the sides of the mirror-frame being provided with spring-operated clamps which bear upon said rod, substantially as shown and described.

2. The combination with a mirror, which is provided transversely of the back thereof, with a friction-tube, which is secured between the sides of the frame, and the ends of which register with openings formed in said sides, and a rod which is passed through the sides of the frame and into said tube, and which is adapted to turn therein, and one end of which projects and is provided with an arm at right angles thereto, which is adapted to be passed through keepers or brackets secured to a support, and the sides of the mirror-frame being provided with spring-operated clamps which bear upon said rod, the spring by which the clamps are operated being mounted in chambers longitudinally of the sides of the frame above and below said rod, substantially as shown and described.

In testimony that we claim the foregoing as our invention we have signed our names, in presence of the subscribing witnesses, this 10th day of October, 1896.

HENRY BADER.
    HARRY DUDLEY CARTWRIGHT.

Witnesses:
 LEE D. CRAIG,
 F. W. DAVIES.